UNITED STATES PATENT OFFICE 2,139,214

PERFORATION OF AN UNPERFORATED POSITIVE FILM IN CORRESPONDENCE WITH PERFORATED NEGATIVE FILM

Karl Wahl, Berlin-Treptow, Germany, assignor to Sifico A. G., Schaffhausen, Switzerland No Drawing. Application February 27, 1937, Serial No. 128,280. In Germany September 8, 1934

7 Claims. (Cl. 164—125)

The invention relates to a method of perforating an unperforated positive film passed through a copying machine in conjunction with a perforated negative film.

The object of the invention is to provide a method by means of which an exact coincidence of the position of the perforations relative to the pictures of the film is ensured in the copy with respect to the original, and thus the flickering of the pictures is avoided with certainty in the projection.

To attain the desired object, according to the invention a perforated negative film and an unperforated positive film are conveyed through the copying machine by means of a friction drive, for instance by means of friction rollers. In the movement of the two films through the exposure aperture or apertures the perforations of the negative film are marked photochemically upon the positive film. The positive film so marked can then be punched with the aid of a device sensitive to radiation, for example a photo-electric cell or the like, as an auxiliary, the photo-chemical perforation marks serving as a controlling means. A suitable device for this step is shown in U. S. Letters Patent No. 696,708 to Bolton and also in German Patent No. 577,035 to Lorenz.

The perforations of the negative film may also be marked upon the positive film, by pressure, or by a dye or coloring matter being sprayed upon it. The punching of the perforation can be effected immediately or subsequently, for instance with the aid of a device sensitive to radiation, such as a photo-electric cell, as an auxiliary.

I claim:

1. The process of perforating a positive film which comprises passing a perforated negative film and an imperforated positive film simultaneously through a copying machine, marking the perforations of the negative upon the positive, film, and perforating the positive, film at the marked locations.

2. The process of claim 1, in which the perforations are marked upon the positive film by a photo-chemical process.

3. The process of claim 1 in which the perforations are marked upon the positive film by pressure.

4. The process of claim 1 in which the perforations are marked upon the positive film by a dye sprayed through the perforations of the positive film.

5. The process of perforating a positive film which comprises passing a perforated negative film and an unperforated positive one simultaneously through a copying machine, marking the location of the perforations of the negative film upon the positive film, passing the perforation markings of the positive film between a source of light and a photo-electric cell which controls a perforating device and perforating said film.

6. The process of perforating a positive film which comprises passing a perforated negative and an unperforated positive film simultaneously through a copying machine and photo-chemically marking the locations of the negative film perforations upon the positive film, passing at least the portion of said positive film having said markings between a source of light and a photo-electric cell controlling a perforating machine and perforating said strip film.

7. A method of perforating a positive film which comprises passing a perforated negative film and an imperforated positive film simultaneously through a copying machine, photo-chemically marking the perforations of the negative film upon the positive film, using said markings for the photo-electric control of a perforating device and perforating said positive film.

KARL WAHL.